United States Patent
Yamamoto et al.

(10) Patent No.: US 9,847,524 B2
(45) Date of Patent: Dec. 19, 2017

(54) NON-AQUEOUS ELECTROLYTE SECONDARY CELL AND METHOD FOR MANUFACTURING SAME

(71) Applicant: NISSAN MOTOR CO., LTD., Yokohama-shi, Kanagawa (JP)

(72) Inventors: Shinji Yamamoto, Kanagawa (JP); Hideaki Tanaka, Kanagawa (JP); Wataru Ogihara, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 497 days.

(21) Appl. No.: 14/395,739

(22) PCT Filed: Mar. 18, 2013

(86) PCT No.: PCT/JP2013/057624
§ 371 (c)(1),
(2) Date: Oct. 20, 2014

(87) PCT Pub. No.: WO2013/161445
PCT Pub. Date: Oct. 31, 2013

(65) Prior Publication Data
US 2015/0079463 A1 Mar. 19, 2015

(30) Foreign Application Priority Data

Apr. 27, 2012 (JP) ................. 2012-102093
Mar. 1, 2013 (JP) ................. 2013-040761

(51) Int. Cl.
*H01M 4/131* (2010.01)
*H01M 4/505* (2010.01)
(Continued)

(52) U.S. Cl.
CPC ......... *H01M 4/131* (2013.01); *H01M 4/0447* (2013.01); *H01M 4/366* (2013.01);
(Continued)

(58) Field of Classification Search
CPC ...... H01M 4/505; H01M 4/525; H01M 4/365; H01M 4/131; H01M 10/0525; H01M 10/44; H01M 10/7011; H01M 10/0567
See application file for complete search history.

(56) References Cited

U.S. PATENT DOCUMENTS

| 6,803,150 | B1 | 10/2004 | Iriyama et al. | |
|---|---|---|---|---|
| 2002/0122973 | A1* | 9/2002 | Manev | H01M 4/133 429/52 |
| 2006/0051671 | A1* | 3/2006 | Thackeray | C01G 45/1221 429/224 |
| 2007/0015055 | A1 | 1/2007 | Lee et al. | |

(Continued)

FOREIGN PATENT DOCUMENTS

| EP | 2731180 A1 | 5/2014 |
|---|---|---|
| JP | 09055211 A | 2/1997 |

(Continued)

*Primary Examiner* — Kenneth J Douyette
(74) *Attorney, Agent, or Firm* — Young Basile Hanlon & MacFarlane, P.C.

(57) ABSTRACT

A non-aqueous electrolyte secondary cell has reduced degradation of the electrolytic solution or the anode active material and high cycle durability. The non-aqueous electrolyte secondary cell includes: a cathode capable of doping and de-doping lithium ions; an anode capable of occluding and releasing lithium ions, lithium or a lithium alloy; and an electrolytic solution containing an organic solvent, a lithium salt electrolyte and an additive. The cathode active material of the cathode contains a layered lithium-containing transition metal oxide of formula $Li_{1.5}[Ni_aCo_bMn_c[Li]_d]O_3$, where a, b, c, and d satisfy
$0<a<1.4$, $0 \le b<1.4$, $0<c<1.4$, $0<d \le 0.5$, $a+b+c+d=1.5$, and $1.0 \le a+b+c<1.5$. The anode active material contains a carbon-based material with the surface fully or partly covered with a coating derived from the additive.

8 Claims, 1 Drawing Sheet

(51) Int. Cl.
    *H01M 10/0567*      (2010.01)
    *H01M 4/525*      (2010.01)
    *H01M 10/0525*      (2010.01)
    *H01M 4/587*      (2010.01)
    *H01M 10/058*      (2010.01)
    *H01M 4/36*      (2006.01)
    *H01M 4/04*      (2006.01)
    *H01M 4/133*      (2010.01)
    *H01M 4/02*      (2006.01)

(52) U.S. Cl.
    CPC .......... *H01M 4/505* (2013.01); *H01M 4/525* (2013.01); *H01M 4/587* (2013.01); *H01M 10/058* (2013.01); *H01M 10/0525* (2013.01); *H01M 10/0567* (2013.01); *H01M 4/133* (2013.01); *H01M 2004/028* (2013.01); *Y02T 10/7011* (2013.01); *Y10T 29/49108* (2015.01)

(56) References Cited

U.S. PATENT DOCUMENTS

| | | | |
|---|---|---|---|
| 2007/0037043 A1* | 2/2007 | Chang | H01M 4/0438 429/50 |
| 2010/0143784 A1* | 6/2010 | Johnson | C01G 45/1221 429/149 |
| 2010/0253292 A1* | 10/2010 | Ren | H01M 10/0525 320/162 |
| 2012/0056590 A1* | 3/2012 | Amiruddin | H01M 10/0525 320/130 |
| 2012/0171542 A1 | 7/2012 | Matsumoto et al. | |

FOREIGN PATENT DOCUMENTS

| | | | | |
|---|---|---|---|---|
| JP | 2005190874 A | * | 7/2005 | ............ H01M 10/40 |
| JP | 2009218112 A | * | 9/2009 | ............ H01M 10/36 |
| JP | 2011066000 A | | 3/2011 | |
| WO | 2011030686 A1 | | 3/2011 | |
| WO | 2013005737 A1 | | 1/2013 | |

* cited by examiner

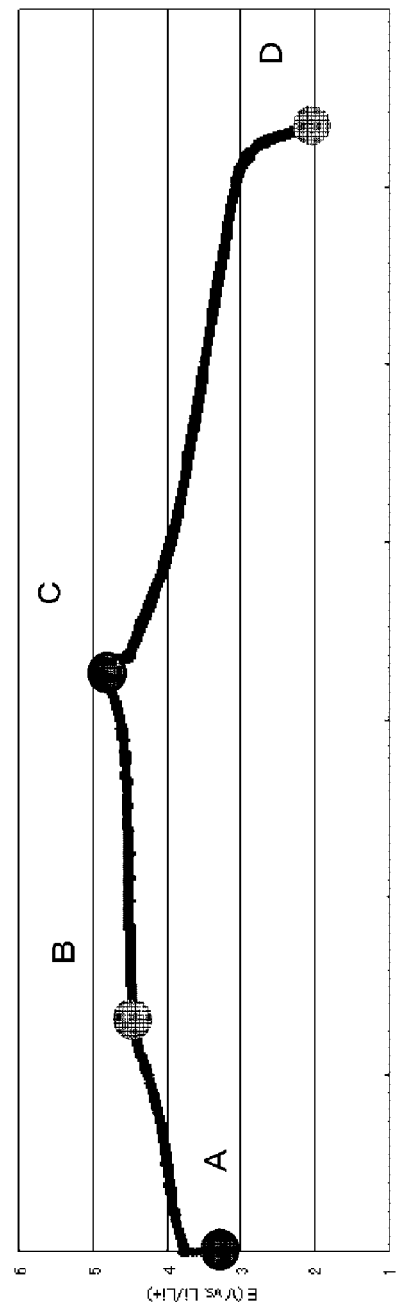

NON-AQUEOUS ELECTROLYTE SECONDARY CELL AND METHOD FOR MANUFACTURING SAME

CROSS REFERENCE TO RELATED APPLICATIONS

The present application claims priority to Japanese Patent Application Nos. 2012-102093, filed Apr. 27, 2012, and 2013-040761, filed Mar. 1, 2013, each incorporated herein in its entirety.

TECHNICAL FIELD

The present invention relates to a non-aqueous electrolyte secondary cell and a method for manufacturing the same, in more detail, to a non-aqueous electrolyte secondary cell with high cycle durability and a method for manufacturing the same.

BACKGROUND

In recent years, it has been seriously desired to reduce carbon dioxide emission in order to cope with air pollution and global warming. In the automobile industry, there are increasing hopes that introduction of electric vehicles (EV), hybrid electric vehicles (HEV) and the like will reduce carbon dioxide emission. For this reason, development of key electric devices to practical use of these vehicles, such as secondary cells for driving a motor, has been actively made.

Among secondary cells for driving a motor, lithium-ion secondary cells have drawn attention for their high theoretical energy, and the development thereof has been being made in a rapid pace. In general, a lithium ion secondary cell includes a cathode formed by applying a cathode slurry containing a cathode active material on the surface of a current collector, an anode formed by applying an anode slurry containing an anode active material on an anode current collector, an electrolyte disposed between the cathode and the anode, and a cell case that houses the cathode, the anode and the electrolyte.

A type of such lithium ion secondary cells for driving a motor is non-aqueous organic electrolytic solution secondary cells that use a combination of a spinel lithium manganate (e.g. $LiMn_2O_4$), a layered lithium nickel oxide (e.g. $LiNi_{1-x}CO_xO_2$) and the like for the cathode active material, a carbon/graphite-based material for the anode active material, and a non-aqueous organic electrolytic solution ($LiPF_6$/EC/DEC) for the electrolytic solution (for example, see Japanese Patent Unexamined Publication No. Hei9-55211).

A problem with such layered lithium-containing transition metal oxides is that their material properties and cell properties greatly depend on not only their composition but also their synthesis method and synthesis conditions. Further, non-aqueous electrolytic solution secondary cells that use a layered lithium-containing transition metal oxide for the cathode active material suffer from insufficient performance (charge-discharge capacity, rate characteristics), insufficient cycle life (capacity retention), low repeatability of the cell properties, wide variation between production lots and the like. On the other hand, cells for automobiles require not only high capacity per unit mass of the active material but also a large storable amount of electricity per unit capacity of the cells.

To cope with the above-described problems and the demands, conventional lithium-ion secondary cells using a layered lithium-containing transition metal oxide (solid solution cathode material) have been subjected to an electrochemical treatment (activating treatment) for increasing the capacity of the cathode active material in which a charge-discharge treatment within or over the potential plateau region of the cathode active material is carried out at least once by applying a voltage of 4.3 V to 4.75 V (for example, see Japanese Patent Unexamined Publication No. 2011-66000).

SUMMARY

However, as a result of studies, the present inventors found that repetitive charge-discharge within or over the potential plateau region of a cathode active material, such as the above-described charge-discharge treatment for activating a cathode active material, is sometimes insufficient to fully activate the cathode active material. Moreover, it is also found that such repetitive charge-discharge may cause degradation of an electrolytic solution and an anode active material, which results in short cell life.

The present invention was made on the basis of these findings, and an object thereof is to provide a non-aqueous electrolyte secondary cell with high cycle durability, an activated cathode active material and reduced degradation of an electrolytic solution or an anode active material, and a method for manufacturing the same.

As a result of diligent study to achieve the above-described object, the present inventors found that the object can be achieved by carrying out a predetermined cathode activating treatment after a predetermined anode aging treatment. The present invention was thus made.

That is, the non-aqueous electrolyte secondary cell of the present invention includes: a cathode capable of doping and de-doping a lithium ion; an anode capable of occluding and releasing lithium, a lithium alloy or a lithium ion; and an electrolytic solution containing an organic solvent, a lithium salt electrolyte and an additive; wherein an cathode active material of the cathode includes: a layered lithium-containing transition metal oxide of the following composition formula (1),

$$Li_{1.5}[Ni_aCo_bMn_c[Li]_d]O_3 \qquad (1)$$

(where a, b, c and d satisfy $0<a<1.4$, $0\leq b<1.4$, $0<c<1.4$, $0<d\leq 0.5$, $a+b+c+d=1.5$, and $1.0\leq a+b+c<1.5$); and a spinel phase as a part of the layered lithium-containing transition metal oxide, and an anode active material of the anode comprises a carbon-based material with a surface partly or fully covered with a coating derived from the additive.

Further, the method for manufacturing a non-aqueous electrolyte secondary cell includes the following Steps (A) and (C): (A) preparing a pre-cell including: a cathode comprising a layered lithium-containing transition metal oxide of the following composition formula (1) as a cathode active material

$$Li_{1.5}[Ni_aCo_bMn_c[Li]_d]O_3 \qquad (1)$$

(where a, b, c and d satisfy $0<a<1.4$, $0\leq b<1.4$, $0<c<1.4$, $0<d\leq 0.5$, $a+b+c+d=1.5$, and $1.0\leq a+b+c<1.5$); an anode comprising a carbon-based material as an anode active material; and an electrolytic solution containing an organic solvent, a lithium salt electrolyte and an additive; (B) carrying out an anode aging treatment that is a charge-discharge cycle treatment of applying a voltage between the cathode and the anode of the prepared pre-cell; and (C) subsequently carrying out a cathode activating treatment that is a charge-discharge treatment of applying a voltage between the cathode and the anode.

According to the present invention, the predetermined cathode activating treatment is carried out after the predetermined anode aging treatment so as to activate the cathode active material and also to cover the all or a part of the surface of the anode active material with the coating derived from the additive. As a result, it becomes possible to provide a non-aqueous electrolyte secondary cell with reduced degradation of the electrolytic solution or the anode active material and high cycle durability, and a method for manufacturing the same.

BRIEF DESCRIPTION OF THE DRAWING

FIG. 1 is a graph for describing the definition of change rate to spinel structure.

DESCRIPTION OF EMBODIMENTS

Hereinafter, a non-aqueous electrolyte secondary cell of the present invention will be described in detail. The non-aqueous electrolyte secondary cell of the present invention includes a cathode capable of doping/de-doping lithium ions, an anode capable of occluding/releasing lithium, a lithium alloy or lithium ions, and an electrolytic solution containing an organic solvent, a lithium salt electrolyte and an additive.

As is also described in detail below, the non-aqueous electrolyte secondary cell of the present invention is typically configured such that the cathode contains a layered lithium-containing transition metal oxide (solid solution cathode material), the anode contains a graphite-based carbon material, and the cell includes a non-aqueous organic electrolytic solution. The non-aqueous organic electrolytic solution secondary cell can acquire high energy density by using for the cathode active material the layered lithium-containing transition metal oxide that partly forms a spinel phase in its crystal structure after the first charge-discharge cycle, and also using the carbon/graphite-based anode active material and the non-aqueous organic electrolytic solution together with this layered lithium-containing transition metal oxide.

To obtain a high-energy density secondary cell, it is required to increase the amount of electricity chargeable per unit mass of the active materials used in the cathode and the anode. To cope with this demand, solid solution cathode materials have been studied as cathode active materials. A type of such solid solution cathode materials that have been studied is layered lithium-containing transition metal oxides that are composed of a solid solution of electrochemically inactive layered $Li_2MnO_3$ and electrically active layered $LiMO_2$ (where M is a transition metal such as Co, Ni, Mn and Fe).

(Cathode Active Material)

In the non-aqueous electrolyte secondary cell of the present invention, the cathode active material of the cathode contains a layered lithium-containing transition metal oxide of the following composition formula (1):

$$Li_{1.5}[Ni_aCo_bMn_c[Li]_d]O_3 \quad (1)$$

where a, b, c and d satisfy 0<a<1.4, 0≤b<1.4, 0<c<1.4, 0<d≤0.5, a+b+c+d=1.5, and 1.0≤a+b+c<1.5. Further, the layered lithium-containing transition metal oxide has a portion that changes to a spinel structure by being charged or charged-discharged within a predetermined potential range. In the present invention, the cell partly includes a spinel phase when it is completed.

The cathode active material of formula (1) is the layered lithium-containing transition metal oxide that is composed of a solid solution of electrochemically inactive layered $Li_2MnO_3$ and electrically active layered $LiMO_2$ (where M is a transition metal such as Co, Ni, Mn and Fe). Among such layered lithium-containing transition metal oxides, lithium-containing transition metal oxides that partly form a spinel phase in their crystal structure (layered phase) by a cathode activating treatment (described below), particularly by the first predetermined charge-discharge cycle, are useful materials that can have an electric capacity of over 200 mAh/g.

(Anode Active Material)

On the other hand, a carbon-based material is used for the anode active material of the anode. The surface of the anode active material is partly or fully covered with a coating that is derived from the additive of the electrolytic solution. The coating is formed by an anode aging treatment (described below), particularly by the first charge-discharge treatment. In the non-aqueous electrolyte secondary cell of the present invention, it is preferred that the anode active material is covered with the coating without leaving many apertures, more preferably in a tight manner. Such a coating effectively prevents the anode from degradation.

A preferred carbon-based material used for the anode active material is a graphite material that is covered with an amorphous carbon layer, is composed of a non-flake graphite, and makes the anode active material having a BET specific surface area within the range from 0.8 to 1.5 m²/g and a tap density within a range from 0.9 to 1.2 cm²/g. Materials having a BET specific surface area within the above-described range exhibit good diffusion of Li ions into their layered graphite structure, and also contribute to improving the cycle life of a cell. Further, materials having a tap density within the above-described range are useful for increasing the weight per unit volume so as to increase the amount of electricity.

(Electrolytic Solution)

The electrolytic solution contains the organic solvent, the lithium salt electrolyte and the additive. First, such lithium salt electrolytes include alkali metal salts that contain lithium hexafluorophosphate ($LiPF_6$).

Examples of such organic solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), fluoroethylene carbonate (FEC) and the like. They may be used alone or in combination. These organic solvents are useful for dissolving the lithium salt electrolyte.

Further, the additive may be any additive that can form the coating on all or a part of the surface of the anode active material, and can improve the cycle life. Examples of such additives include organic sulfone compounds, organic disulfone compounds, vinylene carbonate derivatives, ethylene carbonate derivatives, ester derivatives, divalent phenol derivatives, terphenyl derivatives and phosphate derivatives, and the combinations thereof.

Such organic sulfone compounds include sultone derivatives and cyclic sulfonates, such as 1,3-propanesultone (saturated sultone) and 1,3-propenesultone (unsaturated sultone).

Such organic disulfone compounds include disultone derivatives and cyclic disulfonate, such as methylene methanedisulfonate.

Such vinylene carbonate derivatives include vinylene carbonate (VC), and such ethylene carbonate derivatives include fluoroethylene carbonate (FEC).

Examples of such ester derivatives include 4-biphenylyl acetate, 4-biphenylyl benzoate, 4-biphenylylbenzyl carboxylate and 2-biphenylyl propionate.

Examples of such divalent phenol derivatives include 1,4-diphenoxybenzene and 1,3-diphenoxybenzene.

Such ethylene glycol derivatives include 1,2-diphenoxyethane, 1-(4-biphenylyloxy)-2-phenoxyethane and 1-(2-biphenylyloxy)-2-phenoxyethane.

Such terphenyl derivatives include o-terphenyl, m-terphenyl, p-terphenyl, 2-methyl-o-terphenyl and 2,2-dimethyl-o-terphenyl, and such phosphate derivatives include triphenylphosphate and the like.

(Ones Subjected to Anode Aging Treatment and Cathode Activating Treatment)

The non-aqueous electrolyte secondary cell of the present invention is obtained through charge-discharge cycle treatments of applying a voltage between the cathode and the anode. The charge-discharge cycle treatments include the anode aging treatment to form the coating derived from the additive on all or a part of the surface of the anode active material and the subsequent cathode activating treatment to partly form a spinel phase in the layered lithium-containing transition metal oxide of the cathode active material. The spinel phase is not formed in the anode aging treatment.

The material properties and the cell properties of the layered lithium-containing transition metal oxide of the above-described formula (1) greatly depend on not only its composition but also its synthesis method and synthesis conditions. This is thought to be based on a change of the crystal structure as described below. That is, it can be assumed that the layered lithium-containing transition metal oxide normally has a NaCl-type cubic structure composed of corner-shared NaCl-type hexagonal crystal structure. The lattice constant ratio c/a in this case is approximately 4.9. However, the NaCl-type hexagonal crystal structure has a distortion of expanding along c axis due to oxygen-oxygen repulsion. Accordingly, the c/a ratio becomes greater than 4.9. As a result, the changing c axis length greatly affects the Li diffusion distance and the structural stability, which eventually affects the cell properties. As is also described in detail along with a method for manufacturing the cell, the present invention is to improve such defects due to the nature of the layered lithium-containing transition metal oxide by the cathode activating treatment, and also to reduce degradation of the anode by the anode aging treatment.

Next, a method for manufacturing the non-aqueous electrolyte secondary cell of the present invention will be described. The method for manufacturing the non-aqueous electrolyte secondary cell of the present invention includes:

(A) preparing a pre-cell that includes a cathode including the layered lithium-containing transition metal oxide of the above composition formula (1) as a cathode active material, an anode including a carbon-based material as an anode active material, and an electrolytic solution including an organic solvent, a lithium salt electrolyte and an additive;

(B) carrying out an anode aging treatment that is a charge-discharge cycle treatment of applying a voltage between the cathode and the anode of the obtained pre-cell; and (C) subsequently carrying out a cathode activating treatment that is a charge-discharge cycle treatment of applying a voltage between the cathode and the anode.

As described above, in the present invention, after preparing the pre-cell (an uncharged cell to be put in practical use), (B) the anode aging treatment is carried out to impart durability to the anode active material, and then (C) the cathode activating treatment is carried out to activate the cathode active material. Both of the anode aging treatment and the cathode activating treatment are a charge-discharge cycle treatment in which a charge and a discharge are repeated at least once by applying a voltage between the cathode and the anode of the pre-cell. In this process, it is preferred that the voltage applied in the anode aging treatment is lower than the voltage applied in the cathode activating treatment. If a high voltage is abruptly applied in the cathode activating treatment, the coating of high quality may not be formed on the surface of the node active material. In contrast, the above-described voltage control enables forming the coating of high quality.

By carrying out (B) the anode aging treatment and (C) the cathode activating treatment in the order from Step (B) to Step (C), which are both based on a charge-discharge cycle treatment, both high performance and high durability can be imparted to the lithium-ion cell including the solid solution cathode/non-aqueous electrolytic solution/graphite anode.

(Preparation of Pre-Cell)

In the pre-cell preparing step of Step (A), the pre-cell (uncharged cell) may be prepared by an ordinary method using the above-described materials, a separator known in the art and the like. The shape of the cell may be of any type such as so-called laminate cell, coin-cell cell and bipolar cell.

(Anode Aging Treatment)

The anode aging treatment of Step (B) is a charge-discharge cycle treatment of applying a voltage between the cathode and the anode of the pre-cell. Specifically, the voltage of the pre-cell is controlled so that the pre-cell is maintained at a predetermined charge level for a predetermined time period in the process in which the voltage (output voltage) of the pre-cell rises from the initial value to the upper limit value.

The "predetermined charge level" is within the range from 10% to 30% of the SOC (state of charge), which corresponds to a full charge. The "predetermined time period" is within the range from 1 hour to 7 days. The charging rate in the anode aging treatment is within the range from 0.01 C to 0.2 C. By charging the cell to 10% to 30% of the SOC at such a slow rate, the additive contained in the electrolytic solution is gradually degraded to form the coating derived from the additive (a kind of protective coating) on the surface of the anode active material. The durability of the anode active material can thus be improved. It is important to charge the cell at such a low rate in order to partly degrade the additive in the electrolytic solution to form the uniform coating on a part or the whole of the surface of the anode active material. The SOC of the cell can be determined by preparing a sample cell and measuring the SOC thereof in advance.

As described above, in the anode aging treatment, the charge level of the cell is maintained within the range from 10% to 30% of the SOC (typically corresponding to an applied voltage approximately within the range from 2.0 V to 3.6 V) for 1 hour to 7 days. This treatment partly degrades the additive of the electrolytic solution to form the coating on all or a part of the surface of the anode active material, and also degrades and removes moisture in the electrolytic solution. Furthermore, this treatment allows the electrolytic solution to penetrate into the electrode so as to secure a pathway for inserting lithium ions ($Li^+$) in the graphite structure (interlayer) of the anode active material. In this anode aging treatment, a spinel phase is not formed in the layered lithium-containing transition metal oxide of the cathode active material.

(Cathode Activating Treatment)

The cathode activating treatment of Step (C) is a charge-discharge treatment of applying a voltage between the electrodes similar to the above-described Step (B) (anode aging treatment). Specifically, after the anode aging treatment, a voltage typically ranging from 4.3 to 4.65 V is applied to repeat a charge-discharge at least to the potential plateau region of the cathode active material used (see the above formula (1)) at least once.

It should be understood that this charge and discharge treatment (charge-discharge cycle treatment) may be repeated for two or more times. This cathode activating treatment can increase the capacity of the cathode active material. The potential plateau region of the cathode active material typically corresponds to the range from 4.3 to 4.65 V in applied voltage.

As described above, in the present invention, it is important to expose the cathode active material at least to its potential plateau region at least once by applying a voltage within the range from 4.3 to 4.65 V in order to increase the capacity of the cathode active material. The exposure of the cathode active material at least to its potential plateau region at least once can change the crystal structure of the cathode active material to a suitable state, so as to improve diffusion (mobility during charging or discharging) of Li ions in the crystal structure. This results in an increased capacity (mAh/g).

Specifically, the part that is dissolved in the crystal structure of the layered lithium-containing transition metal oxide of the above-described formula (1) to form a solid solution can change its structure to spinel structure by a charge or a charge-discharge to the predetermined potential range. This part partly forms a spinel phase to allow migration of a lot of Li ions while the crystal structure is maintained, and thereby allows for higher charging capacity and higher discharging capacity. The change rate to spinel phase of the layered lithium-containing transition metal oxide can be represented by k value. In the present invention, the k value is preferably from 0.25 to 1.0 of the theoretical amount of structural change, i.e. the k value preferably satisfies 0.25≤k<1.0. If the k value is out of this range, the capacity of the cathode active material may not be increased as intended, and the intended advantageous effects may not be obtained.

The theoretical amount of structural change of the cathode active material can be determined beforehand as follows. As used herein, the "change rate to spinel structure" represents a rate of the layered $Li_2MnO_3$ that changed to spinel $LiMn_2O_4$ in the lithium-containing transition metal oxide solid solution by the charge or charge-discharge to the predetermined potential range. If all of the layered $Li_2MnO_3$ changes to spinel $LiMn_2O_4$ in the lithium-containing transition metal oxide solid solution, the change rate to spinel structure becomes 1. Specifically, the change rate to spinel structure is defined by the following equation.

$$\begin{pmatrix} \text{Charge rate to} \\ \text{spinel structure } (K) \end{pmatrix} = \frac{\begin{pmatrix} \text{Actual capacity within} \\ \text{plateau region} \end{pmatrix}}{\begin{pmatrix} \text{Theoretical capacity based} \\ \text{on } Li2MnO3 \text{ in} \\ \text{solid solution}(VS) \end{pmatrix} \times \begin{pmatrix} \text{Compositional ratio} \\ \text{of } Li2MnO3 \text{ in} \\ \text{solid solution}(x) \end{pmatrix}}$$

The definition of the "change rate to spinel structure" will be described with an example as illustrated in FIG. 1 where a cell with a cathode including the lithium-containing transition metal oxide solid solution as a cathode active material undergoes several states from an uncharged initial state A to a charged state B where the cell is charged to 4.5 V, to an overcharged state C where the cell is charged to 4.8 V, and to a discharged state D where the cell is discharged to 2.0 V. The "actual capacity within plateau region" of the above equation can be determined by measuring the actual capacity within the plateau region in FIG. 1 (specifically, the region from 4.5 V to 4.8 V where the crystal structure changes (actual capacity $V_{BC}$ from the charged state B to the overcharged state C, actual capacity within the plateau region)).

In practice, in the lithium-containing transition metal oxide solid solution of the above-described composition formula (1), the actual capacity $V_{AB}$, which is the capacity within the region AB from the initial state A to the charged state B where the cell is charged to 4.5 V, corresponds to the composition (y) and the theoretical capacity ($V_L$) of $LiMO_2$, the layered structure portion. The actual capacity $V_{BC}$, which is the capacity within the region BC from the charged state B where the cell is charged to 4.5 V to the overcharged state C where the cell is charged to 4.8 V, corresponds to the compositional ratio (x) and the theoretical capacity (Vs) of $LiMn_2O_3$, the spinel structure portion. Let the actual capacity ($V_T$) measured from the initial state A to a predetermined point in the plateau region be ($V_T = V_{AB} V_{BC}$), $V_{AB} = y(V_L)$ and $V_{BC} = x(V_S)K$. Accordingly, the change rate to spinel structure can be calculated based on the following equation (M is at least one element selected from the group consisting of nickel (Ni), cobalt (Co) and manganese (Mn)).

$$\begin{pmatrix} \text{Charge rate to} \\ \text{spinel structure } (K) \end{pmatrix} = \frac{\begin{pmatrix} \text{Cumulative actual} \\ \text{capacity up to} \\ \text{plateau region}(VT) \end{pmatrix} - \begin{pmatrix} \text{Theoretical capacity} \\ \text{based on } LiMO2 \text{ in} \\ \text{solid solution}(VL) \end{pmatrix} \times \begin{pmatrix} \text{Compositional ratio} \\ \text{of } LiMO2 \text{ in} \\ \text{solid solution}(y) \end{pmatrix}}{\begin{pmatrix} \text{Theoretical capacity} \\ \text{based on } Li2MnO3 \text{ in} \\ \text{solid solution}(VS) \end{pmatrix} \times \begin{pmatrix} \text{Compositional ratio} \\ \text{of } Li2MnO3 \text{ in} \\ \text{solid solution}(x) \end{pmatrix}}$$

Further, the "compositional ratio of $Li_2MnO_3$ in the solid solution" can be calculated from the composition formula of the lithium-containing transition metal oxide solid solution. The presence of the layered structure portion or the spinel structure portion in the lithium-containing transition metal oxide solid solution can be determined based on the presence of x-ray diffraction analysis (XRD) peaks specific to the layered structure or the spinel structure, and the ratios thereof can be determined by measuring/calculating the capacities as described above.

The change rate to spinel structure does not become 1.0. Further, if it is less than 0.25, the resulting lithium-containing transition metal oxide solid solution can only exhibit a discharge capacity and a capacity retention up to those of conventional lithium-containing transition metal oxide solid solutions.

In the present invention, it is preferred that the cathode activating treatment is composed of a charge-discharge treatment of applying a voltage less than the potential plateau region of the cathode active material at least once and at least one subsequent charge-discharge treatment at least to the potential plateau region of the cathode active material.

Specifically, before applying a voltage within or over the potential plateau region of the cathode active material, a charge-discharge treatment at a voltage less than the potential plateau region is carried out at least once within the range from 40% to 70% of the SOC (typically, an applied voltage of approximately from 3.7 V to 4.3 V), so as to re-impart durability to the anode active material and to activate the cathode active material by partly changing the crystal structure thereof (to cause 20% or less of the final structure change).

This charge-discharge treatment can reform the coating on all or a part of the surface of the anode active material that is expanded due to the increased amount of charge. Further, by undergoing the state where the crystal structure of the cathode active material is partly changed, the cathode active material is prevented from microscopic degradation (crystal breakage) of its crystal structure on the surface of the particles due to a large voltage change. As a result, when a voltage within or over the potential plateau range is applied, the structure change of the cathode active material occurs in such a suitable manner as to improve the charge-discharge capacity. Furthermore, the crystal structure change on the surface of the cathode active material also occurs in such a suitable manner as to improve the durability of the anode active material.

Further, in the cathode activating treatment of the present invention, it is preferred that one or more of the charge-discharge treatment of applying a voltage less than the potential plateau area of the cathode active material is carried out in a constant current cycle in which the charging rate is equal to or less than the discharging rate, i.e. the charging rate the discharging rate. A voltage within or over the potential plateau area is applied in such a manner that the charging rate and the discharging rate is changed in stages while satisfying the charging rate the discharging rate so that the coating formed on the surface of the anode active material is protected.

The charge-discharge cycle treatment of applying a voltage less than the potential plateau region can improve the charge-discharge capacity by improving the structural change of the cathode active material, and can also improve the durability of the anode active material by improving the formation of the SEI coating (protective coating) on all or a part of the surface of the anode active material. As a result, it becomes possible to apply a voltage within or over the potential plateau area while protecting the coating formed on the surface of the anode active material in such a manner that the charging rate and the discharging rate is changed in stages while satisfying the charging rate≤the discharging rate.

Furthermore, in the present invention, after the above-described anode aging treatment and the cathode activating treatment, it is preferred to carry out a charge-discharge treatment of holding the cell at a maximal charged state corresponding to 60% or more to less than 100%, desirably 80% or more to less than 100% of the SOC typically for 1 hour to 30 days. In the maximal charged state, which corresponds to a full charge state in a practical use, the durability of the anode active material can be improved by re-degradation of the additive contained in the electrolytic solution.

Specifically, after the above-described anode aging treatment and the cathode activating treatment, the cell is held at the practical SOC (e.g. the practical upper limit of the voltage, 4.4 V to 4.5 V) for 1 hour or more. This treatment can further promote the structural change of the cathode active material and the formation of the SEI coating (protective coating) on the surface of the anode active material so as to further improve the performance and the durability.

EXAMPLES

Hereinafter, the present invention will be described in more detail with inventive and comparative examples. However, it is not intended that the present invention is limited to these inventive examples.

Cathode Manufacture Example 1

This example and the following cathode manufacture examples 2 to 4 illustrate examples of manufacturing a cathode.

(Cathode Active Material)

A layered lithium-containing transition metal oxide of the composition formula $Li_{1.5}[Ni_{0.2}Co_{0.2}Mn_{0.8}[Li]_{0.3}]O_3$, $a+b+c+d=1.5$, $d=0.3$, $a+b+c=1.2$ was used as a cathode active material.

(Composition of Cathode Slurry)

A cathode slurry used had the following composition.

Active material: $Li_{1.5}[Ni_{0.2}Co_{0.2}Mn_{0.8}[Li]_{0.3}]O_3$, 100 parts by weight Electrically conductive agent: flake graphite, 1.0 part by weight Acetylene black, 3.0 parts by weight Binder: polyvinylidene fluoride (PVDF), 3.0 parts by weight Solvent: N-methylpyrrolidone (NMP), 65 parts by weight (Manufacture of Cathode Slurry)

The cathode slurry having the above composition was prepared as follows. First, 3.0 parts by weight of the binder was dissolved in 30 parts by weight of NMP to prepare a binder solution. Then, 33.0 parts by weight of the binder solution was added to a powder mixture of 4.0 parts by weight of the electrically conductive agent and 100 parts by weight of the cathode active material powder, and the mixture was kneaded in a planetary mixer (Asada Iron Works Co., Ltd., PVM100). Thereafter, 35 parts by weight of NMP was added to the kneaded mixture to prepare the cathode slurry (solid content of 62 mass %).

(Application and Drying of Cathode Slurry)

The cathode slurry was applied on one surface of a 20 µm-thick aluminum current collector foil by a die coater in which the current collector foil was fed at a feeding rate of 1 m/min. Subsequently, the current collector foil on which the cathode slurry was applied was dried in a hot air dryer (100° C. to 110° C., drying time of 3 min) so that the amount of residual NMP in the electrode active material layer was reduced to 0.02 mass % or less. Similarly, the slurry was also applied on the back face of the aluminum foil and dried. A sheet electrode having electrode active material layers on both sides was thus formed.

(Pressing of Electrode)

The sheet electrode was press-molded by a roller press, and was cut into a cathode C1. The cathode C1 had a weight of each active material layer of approximately 25 mg/cm$^2$, a thickness of approximately 100 μm, and a density of 2.85 g/cm$^3$. No crack was observed on the surfaces of the cathode C1.

(Drying of Electrode)

Next, the cathode C1 was dried in a vacuum dryer. After placing the cathode C1 in the dryer, the pressure was reduced (100 mmHg (1.33×10$^4$ Pa) at room temperature (25° C.) to remove air in the dryer. Subsequently, the temperature was raised to 120° C. at 10° C./min under nitrogen gas flow (100 cm$^3$/min). At 120° C., the pressure was reduced again to discharge nitrogen in the chamber, and was held for 12 hours. The temperature was then decreased to room temperature. The cathode C11 was thus obtained. The specification and the like of the cathode active material of this example are shown in Table 1.

Cathode Manufacture Example 2

(Cathode Active Material)

A layered lithium-containing transition metal oxide of the composition formula $Li_{1.5}[Ni_{0.25}Co_{0.25}Mn_{0.75}[Li]_{0.25}]O_3$, a+b+c+d=1.5, d=0.25, a+b+c=1.25 was used as a cathode active material. Except for this, the same procedure as that of the cathode manufacture example 1 was repeated to obtain a cathode C12 of this example. The specification and the like of the cathode active material of this example are shown in Table 1.

Cathode Manufacture Example 3

(Cathode Active Material)

A layered lithium-containing transition metal oxide of the composition formula $Li_{1.5}[Ni_{0.45}Mn_{0.85}[Li]_{0.20}]O_3$, a+b+c+d=1.5, d=0.20, a+b+c=1.3 was used as a cathode active material. Except for this, the same procedure as that of the cathode manufacture example 1 was repeated to obtain a cathode C13 of this example. The specification and the like of the cathode active material of this example are shown in Table 1.

Cathode Manufacture Example 4

(Cathode Active Material)

A layered lithium-containing transition metal oxide of the composition formula $Li_{1.5}[Ni_{0.525}Mn_{0.825}[Li]_{0.15}]O_3$, a+b+c+d=1.5, d=0.15, a+b+c=1.35 was used as a cathode active material. Except for this, the same procedure as that of the cathode manufacture example 1 was repeated to obtain a cathode C14 of this example. The specification and the like of the cathode active material of this example are shown in Table 1.

TABLE 1

| Cathode Manufacture Example No. | Composition Formula $Li_{1.5}[Ni_aCo_bMn_c[Li]_d]O_3$ a + b + c + d = 1.5, 0 < d ≤ 0.5, 1 ≤ [a + b + c] < 1.5 | | | | | | Theoretical Value | Spinal Phase | Rate of Structural Change k |
|---|---|---|---|---|---|---|---|---|---|
| | Ni a | Co b | Mn c | [Li] d | a + b + c + d | a + b + c | | Measured Value | |
| 1 | 0.20 | 0.20 | 0.80 | 0.30 | 1.50 | 1.20 | 0.60 | 0.48 | 0.79 |
| 2 | 0.25 | 0.25 | 0.73 | 0.27 | 1.50 | 1.23 | 0.50 | 0.35 | 0.70 |
| 3 | 0.45 | 0.00 | 0.85 | 0.20 | 1.50 | 1.30 | 0.40 | 0.25 | 0.62 |
| 4 | 0.525 | 0.00 | 0.825 | 0.15 | 1.50 | 1.35 | 0.30 | 0.19 | 0.63 |

Anode Manufacture Example 1

This example shows an example of manufacturing an anode.

(Composition of Anode Slurry)

An anode slurry used had the following composition.

Active material: natural graphite, 100 parts by weight

Electrically conductive agent: acetylene black, 1.0 part by weight

Binder: polyvinylidene fluoride (PVDF), 5.0 parts by weight

Solvent: N-methylpyrrolidone (NMP), 97 parts by weight (Manufacture of Anode Slurry)

The anode slurry of the above-described composition was prepared as follows. First, 5.0 parts by weight of the binder was dissolved in 50 parts by weight of NMP to prepare a binder solution. Then, 55.0 parts by weight of the binder solution was added to a powder mixture of 1.0 part by weight of the electrically conductive agent and 100 parts by weight of natural graphite, and the mixture was kneaded in a planetary mixer (Asada Iron Works Co., Ltd., PVM100). Thereafter, 47 parts by weight of NMP was added to the kneaded mixture to prepare the anode slurry (solid content of 52 wt %).

(Application and Drying of Anode Slurry)

The anode slurry was applied on one surface of a 10 μm-thick electrolytic copper current collector foil by a die coater in which the current collector foil was fed at a feed rate of 1.5 m/min. Subsequently, the current collector foil on which the anode slurry was applied was dried in a hot air dryer (100° C. to 110° C., drying time of 2 min) so that the amount of residual NMP in the electrode active material layer was reduced to 0.02 mass % or less. Similarly, the slurry was also applied on the back face of the electrolytic copper foil and dried. A sheet electrode having electrode active material layers on both sides was thus formed.

(Pressing of Electrode)

The sheet electrode was press-molded by a roller press, and was cut into an anode A1. The anode A1 had a weight of each active material layer of approximately 10 mg/cm$^2$, a thickness of approximately 50 and a density of 1.45 g/cm$^3$. No crack was observed on the surfaces of the anode A1.

(Drying of Electrode)

Next, the anode A1 thus prepared was dried in a vacuum dryer. After placing the anode A1 in the dryer, the pressure was reduced (100 mmHg (1.33×10$^4$ Pa) at room temperature (25° C.) to remove air in the dryer. Subsequently, the temperature was raised to 135° C. at 10° C./min under nitrogen gas flow (100 cm³/min). At 135° C., the pressure was reduced again to discharge nitrogen in the chamber, and was held for 12 hours. The temperature was then decreased to room temperature. The anode A11 was thus obtained.

Pre-Cell Manufacture Example 1

(Manufacture of Pre-Cell)

Tabs were welded to current collector foil parts of the anode A11 (active material layer area of 3.4 cm in length× 5.0 cm in width) and the cathode C11 (active material layer area of 3.8 cm in length×5.5 cm in width). Between the anode A11 and the cathode C11 with the welded tabs, polypropylene porous separators (S) (4.5 cm in length×6.0 cm in width, 25 μm-thick, porosity of 55%) were interposed to prepare a laminated cell element composed of five layers (e.g. a laminate of A11-(S)-C11-(S)-A11). Then, the cell element was sandwiched between aluminum laminate films (5.0 cm in length, 6.5 cm in width), and three sides thereof were sealed by thermal compression bonding. The cell element was thus housed. Next, 1.0 mol/L of $LiPF_6$ was dissolved in a mixed solvent of 30 vol % ethylene carbonate (EC) and 70 vol % diethyl carbonate (DEC). Thereafter, 1.0 mass % of methylene methanedisulfonate, 1.0 mass % of vinylene carbonate (VC) and 1.0 mass % of 1,3-propane sultone were dissolved thereto to obtain an electrolytic solution. The electrolytic solution was injected to the housed cell element in the amount of 0.5 cm³/cell, and thereafter the remaining side was sealed by thermal compression bonding. A laminate cell (pre-cell) was thus prepared. Thereafter, the prepared laminate pre-cell was mounted on a test cell attaching jig, and a cathode lead and an anode lead were attached to the respective tab ends of the cell element. The pre-cell was then subjected to a test. The specification and the like of the pre-cell of this example are shown in Table 2.

Pre-Cell Manufacture Examples 2 to 17

Pre-cells of respective examples were prepared by repeating the same procedure as that of the pre-cell manufacture example 1. The specifications of the pre-cells are shown in Table 2.

TABLE 2

| Pre-Cell Manufacture Example | Cathode | Anode | Electrolytic Solution | | | | | | Lithium Salt | Additive | | |
|---|---|---|---|---|---|---|---|---|---|---|---|---|
| | | | Cyclic Carbonate | | | Chain Carbonate | | Ether | | | | |
| | | | vol. % | vol. % | vol. % | vol. % | vol. % | | mol. % | wt. % | wt. % | wt. % |
| 1 | C13 | A11 | EC, 30 | — | — | DEC, 70 | — | — | LiPF6, 1.0 | VC, 1.0 | MDSM, 1.0 | PS, 1.0 |
| 2 | C13 | A11 | EC, 30 | — | — | DEC, 70 | — | — | LiPF6, 1.0 | VC, 1.5 | MDSM, 1.5 | — |
| 3 | C13 | A11 | EC, 30 | — | — | DEC, 70 | — | — | LiPF6, 1.0 | VC, 2.0 | — | — |
| 4 | C13 | A11 | EC, 30 | — | — | DEC, 70 | — | — | LiPF6, 1.0 | — | MDSM, 2.0 | — |
| 5 | C13 | A11 | EC, 30 | — | — | DEC, 70 | — | — | LiPF6, 1.0 | — | — | PS, 2.0 |
| 6 | C13 | A11 | EC, 25 | — | FEC, 5 | DEC, 70 | — | — | LiPF6, 1.0 | VC, 1.0 | MDSM, 1.0 | PS, 1.0 |
| 7 | C13 | A11 | EC, 20 | — | FEC, 10 | DEC, 70 | — | — | LiPF6, 1.0 | VC, 1.0 | MDSM, 1.0 | PS, 1.0 |
| 8 | C13 | A11 | EC, 15 | — | FEC, 15 | DEC, 70 | — | — | LiPF6, 1.0 | VC, 1.0 | MDSM, 1.0 | PS, 1.0 |
| 9 | C13 | A11 | EC, 25 | PC, 5 | — | DEC, 70 | — | — | LiPF6, 1.0 | VC, 1.0 | MDSM, 1.0 | PS, 1.0 |
| 10 | C13 | A11 | EC, 15 | PC, 5 | FEC, 10 | DEC, 70 | — | — | LiPF6, 1.0 | VC, 1.0 | MDSM, 1.0 | PS, 1.0 |
| 11 | C13 | A11 | EC, 10 | PC, 10 | FEC, 10 | DEC, 70 | — | — | LiPF6, 1.0 | VC, 1.0 | MDSM, 1.0 | PS, 1.0 |
| 12 | C11 | A11 | — | FEC, 10 | FCyC, 10 | — | FChC, 60 | FE, 20 | LiPF6, 1.0 | VC, 1.0 | MDSM, 1.0 | PS, 1.0 |
| 13 | C12 | A11 | PC, 10 | FEC, 10 | — | — | FChC, 60 | FE, 20 | LiPF6, 1.0 | VC, 1.0 | MDSM, 1.0 | PS, 1.0 |
| 14 | C14 | A11 | PC, 10 | — | FCyC, 10 | DEC, 70 | — | FE, 20 | LiPF6, 1.0 | VC, 1.0 | MDSM, 1.0 | PS, 1.0 |
| 15 | C11 | A11 | EC, 30 | — | — | DEC, 70 | — | — | LiPF6, 1.0 | — | — | PS, 1.5 |
| 16 | C12 | A11 | EC, 30 | — | — | DEC, 70 | — | — | LiPF6, 1.0 | — | MDSM, 1.0 | PS, 1.5 |
| 17 | C14 | A11 | EC, 30 | — | — | DEC, 70 | — | — | LiPF6, 1.0 | VC, 1.0 | MDSM, 1.0 | PS, 1.5 |

In Table 2, EC: ethylene carbonate, PC: propylene carbonate, FEC: fluoroethylene carbonate, FCyC: fluorinated cyclic carbonate, DEC: diethyl carbonate, FChC: fluorinated chain carbonate, FE: fluorinated ether, VC: vinylene carbonate, MDSM: methylene methane disulfonate, PS: 1,3-propane sultone; PD: phosphate derivative.

Inventive Example 1

The cell prepared according to the pre-cell manufacture example 1 was subjected to the anode aging treatment and the activating treatment in the conditions shown in Table 4 described below. The cell of this example was thus obtained.

(Anode Aging Treatment (Anode Stabilizing Treatment)

The aging treatment of the cell was carried out as follows. The cell was charged by a constant current charging method at 0.05 C for 4 hours (approximately 20% of the SOC) at 25°

C. Then, the cell was further charged to 4.25 V at a rate of 0.1 C at 25° C., and the charging was then terminated. The cell was held at the state (approximately 50% of the SOC) for approximately 5 days (120 hours) (see Step 1 and Step 2 of Table 4).

(Cathode Activating Treatment (Electrochemical Pretreatment))

At 25° C., the cell was subjected to two cycles of charging by a constant current charging method at 0.2 C until the voltage reaches 4.45 V and then discharging to 2.0 V at 0.2 C, one cycle of charging to 4.55 V at 0.2 C and then discharging to 2.0 V at 0.2 C, and two cycles of charging to 4.65 V at 0.2 C and the discharging to 2.0 V at 0.2 C (see Step 3 to Step 7). The cell was further charged to 4.45 V at a rate of 0.2 C at 45° C., and the charging was then terminated. The cell was held in the state (approximately 85% of SOC) for approximately 5 days (120 hours) (see Step 8). In this example, a constant current charging method was used, and the electrochemical pretreatment method, wherein voltage was the condition for termination, is used. However, the charging method may also be a constant-current constant-voltage charging method. Further, charge amount or time may be the condition for termination instead of voltage.

(Evaluation of Cell Properties)

(Evaluation of Performance)

To evaluate the cell, charging was carried out by a constant-current constant-voltage method in which the cell was charged at a rate of 0.2 C until the maximal voltage reaches 4.5 V, and then was held for approximately 1 to 1.5 hours. Further, discharging was carried out by a constant current discharging method in which the cell was discharged at a rate of 0.2 C until the minimal voltage reaches 2.0 V. The charging and the discharging were both carried out at room temperature. The obtained result is shown in Table 13.

(Evaluation of Lifetime)

A lifetime test of the cell was carried out by repeating 300 cycles of the charge-discharge at a rate of 1.0 C at 25° C. To evaluate the cell, charging was carried out by a constant-current constant-voltage method in which the cell was charged at a rate of 0.2 C until the maximal voltage reaches 4.45 V, and then was held for approximately 1 to 1.5 hours. Further, discharging was carried out by a constant current discharging method in which the cell was discharged at a rate of 0.2 C until the minimal voltage reaches 2.0 V. The charging and the discharging were both carried out at room temperature. A ratio of the discharge capacity at the 300th cycle to the discharge capacity at the first cycle was used for comparison of capacity retention. The obtained result was shown in Table 13.

Inventive Examples 2 to 27

Using the pre-cells shown in Table 2, the same procedure as that of Inventive Example 1 was repeated to obtain cells of respective examples. The anode aging treatments and the cathode activating treatments for the respective examples are shown as Conditions 1 to 8 of Tables 4 to 11. The cells of the respective examples were subjected to the above-described performance evaluation and the lifetime evaluation. The obtained results were shown in Table 13.

Comparative Examples 1 to 4

Using the pre-cells shown in Table 3, the same procedure as that of Inventive Example 1 was repeated to obtain cells of respective examples. The anode aging treatments and the cathode activating treatments for the respective examples are shown as Condition 9 of Table 12. The cells of the respective examples were subjected to the above-described performance evaluation and the lifetime evaluation. The obtained results were shown in Table 13.

TABLE 3

| | | | Electrolytic Solution | | | | | |
| --- | --- | --- | --- | --- | --- | --- | --- | --- |
| Comparative | | | Ethylene Carbonate (EC) | Diethyl Carbonate (DEC) | LiPF6 | Additive | | |
| Example | Cathode | Anode | vol. % | vol. % | mol % | Vol. % | wt. % | wt. % | wt. % |
| 1 | C13 | A11 | 30 | 70 | 1.0 | — | VC, 1.0 | MDSM, 1.0 | PS, 1.0 |
| 2 | C13 | A11 | 15 | 70 | 1.0 | FEC, 15 | VC, 1.0 | MDSM, 1.0 | PS, 1.0 |
| 3 | C13 | A11 | — | 70 | 1.0 | FEC, 30 | VC, 1.0 | MDSM, 1.0 | PS, 1.0 |
| 4 | C13 | A11 | — | 70 | 1.0 | FEC, 50 | VC, 1.0 | MDSM, 1.0 | PS, 1.0 |

FEC: fluoroethylene carbonate, VC: vinylene carbonate, MDSM: methylene methane disulfonate, PS: 1,3-propane sultone

TABLE 4

Condition 1

| | | Charge-Discharge Operating Condition | | | | | | |
| --- | --- | --- | --- | --- | --- | --- | --- | --- |
| Step | | Temperature ° C. | Operation | Rate C | Time Hr | Anode SOC % (setting) | Cathode SOC % (setting) | Cut-Off Voltage V | Holding Time Hr |
| 1 | Charge | 25 | CC | 0.05 | 4 | 15 | — | — | — |
| 2 | Charge | 25 | CC | 0.1 | 10 | — | 70 | 4.45 | — |
| 3 | Hold | 25 | — | — | — | — | 70 | — | 120 |

TABLE 4-continued

Condition 1

Charge-Discharge Operating Condition

| Step | | Temperature ° C. | Operation | Rate C | Time Hr | Anode SOC % (setting) | Cathode SOC % (setting) | Cut-Off Voltage V | Holding Time Hr |
|---|---|---|---|---|---|---|---|---|---|
| 4 | Discharge | 25 | CC | 0.1 | 10 | — | 10 | 2.0 | — |
| 5 | Charge | 25 | CC | 0.1 | 10 | — | 75 | 4.45 | — |
| 6 | Discharge | 25 | CC | 0.1 | 10 | — | 10 | 2.0 | — |
| 7 | Charge | 25 | CC | 0.1 | 10 | — | 90 | 4.55 | — |
| 8 | Discharge | 25 | CC | 0.1 | 10 | — | 10 | 2.0 | — |
| 9 | Charge | 25 | CC | 0.1 | 10 | — | 100 | 4.65 | — |
| 10 | Discharge | 25 | CC | 0.1 | 10 | — | 10 | 2.0 | — |
| 11 | Charge | 25 | CC | 0.1 | 12 | 80 | — | — | — |
| 12 | Hold | 45 | — | — | — | 80 | — | — | 456 |
| 13 | Hold | 25 | — | — | — | 80 | — | — | 144 |

TABLE 5

Condition 2

Charge-Discharge Operating Condition

| Step | | Temperature ° C. | Operation | Rate C | Time Hr | Anode SOC % (setting) | Cathode SOC % (setting) | Cut-Off Voltage V | Holding Time Hr |
|---|---|---|---|---|---|---|---|---|---|
| 1 | Charge | 45 | CC | 0.05 | 4 | 15 | — | — | — |
| 2 | Charge | 25 | CC | 0.1 | 10 | — | 73 | 4.45 | — |
| 3 | Hold | 25 | — | — | — | — | 73 | — | 120 |
| 4 | Discharge | 25 | CC | 0.1 | 10 | — | 10 | 2.0 | — |
| 5 | Charge | 25 | CC | 0.1 | 10 | — | 75 | 4.45 | — |
| 6 | Discharge | 25 | CC | 0.1 | 10 | — | 10 | 2.0 | — |
| 7 | Charge | 25 | CC | 0.1 | 10 | — | 90 | 4.55 | — |
| 8 | Discharge | 25 | CC | 0.1 | 10 | — | 10 | 2.0 | — |
| 9 | Charge | 25 | CC | 0.1 | 10 | — | 100 | 4.65 | — |
| 10 | Discharge | 25 | CC | 0.1 | 10 | — | 10 | 2.0 | — |
| 11 | Charge | 25 | CC | 0.1 | 12 | 80 | — | — | — |
| 12 | Hold | 45 | — | — | — | 80 | — | — | 456 |
| 13 | Hold | 25 | — | — | — | 80 | — | — | 144 |

TABLE 6

Condition 3

Charge-Discharge Operating Condition

| Step | | Temperature ° C. | Operation | Rate C | Time Hr | Anode SOC % (setting) | Cathode SOC % (setting) | Cut-Off Voltage V | Holding Time Hr |
|---|---|---|---|---|---|---|---|---|---|
| 1 | Charge | 25 | CC | 0.05 | 4 | 15 | — | — | — |
| 2 | Charge | 45 | CC | 0.1 | 10 | — | 73 | 4.45 | — |
| 3 | Hold | 25 | — | — | — | — | 73 | — | 120 |
| 4 | Discharge | 25 | CC | 0.1 | 10 | — | 10 | 2.0 | — |
| 5 | Charge | 25 | CC | 0.1 | 10 | — | 75 | 4.45 | — |
| 6 | Discharge | 25 | CC | 0.1 | 10 | — | 10 | 2.0 | — |
| 7 | Charge | 25 | CC | 0.1 | 10 | — | 90 | 4.55 | — |
| 8 | Discharge | 25 | CC | 0.1 | 10 | — | 10 | 2.0 | — |
| 9 | Charge | 25 | CC | 0.1 | 10 | — | 100 | 4.65 | — |
| 10 | Discharge | 25 | CC | 0.1 | 10 | — | 10 | 2.0 | — |
| 11 | Charge | 25 | CC | 0.1 | 12 | 80 | — | — | — |
| 12 | Hold | 45 | — | — | — | 80 | — | — | 456 |
| 13 | Hold | 25 | — | — | — | 80 | — | — | 144 |

TABLE 7

Condition 4

Charge-Discharge Operating Condition

| Step | | Temperature ° C. | Operation | Rate C | Time Hr | Anode SOC % (setting) | Cathode SOC % (setting) | Cut-Off Voltage V | Holding Time Hr |
|---|---|---|---|---|---|---|---|---|---|
| 1 | Charge | 25 | CC | 0.05 | 4 | 15 | — | — | — |
| 2 | Charge | 25 | CC | 0.1 | 10 | — | 70 | 4.45 | — |
| 3 | Hold | 45 | — | — | — | — | 72 | — | 120 |
| 4 | Discharge | 25 | CC | 0.1 | 10 | — | 10 | 2.0 | — |
| 5 | Charge | 25 | CC | 0.1 | 10 | — | 75 | 4.45 | — |
| 6 | Discharge | 25 | CC | 0.1 | 10 | — | 10 | 2.0 | — |
| 7 | Charge | 25 | CC | 0.1 | 10 | — | 90 | 4.55 | — |
| 8 | Discharge | 25 | CC | 0.1 | 10 | — | 10 | 2.0 | — |
| 9 | Charge | 25 | CC | 0.1 | 10 | — | 100 | 4.65 | — |
| 10 | Discharge | 25 | CC | 0.1 | 10 | — | 10 | 2.0 | — |
| 11 | Charge | 25 | CC | 0.1 | 12 | 80 | — | — | — |
| 12 | Hold | 45 | — | — | — | 80 | — | — | 456 |
| 13 | Hold | 25 | — | — | — | 80 | — | — | 144 |

TABLE 8

Condition 5

Charge-Discharge Operating Condition

| Step | | Temperature ° C. | Operation | Rate C | Time Hr | Anode SOC % (setting) | Cathode SOC % (setting) | Cut-Off Voltage V | Holding Time Hr |
|---|---|---|---|---|---|---|---|---|---|
| 1 | Charge | 25 | CC | 0.05 | 4 | 15 | — | — | — |
| 2 | Charge | 45 | CC | 0.1 | 10 | — | 73 | 4.45 | — |
| 3 | Hold | 45 | — | — | — | — | 73 | — | 120 |
| 4 | Discharge | 25 | CC | 0.1 | 10 | — | 10 | 2.0 | — |
| 5 | Charge | 25 | CC | 0.1 | 10 | — | 75 | 4.45 | — |
| 6 | Discharge | 25 | CC | 0.1 | 10 | — | 10 | 2.0 | — |
| 7 | Charge | 25 | CC | 0.1 | 10 | — | 90 | 4.55 | — |
| 8 | Discharge | 25 | CC | 0.1 | 10 | — | 10 | 2.0 | — |
| 9 | Charge | 25 | CC | 0.1 | 10 | — | 100 | 4.65 | — |
| 10 | Discharge | 25 | CC | 0.1 | 10 | — | 10 | 2.0 | — |
| 11 | Charge | 25 | CC | 0.1 | 12 | 80 | — | — | — |
| 12 | Hold | 45 | — | — | — | 80 | — | — | 456 |
| 13 | Hold | 25 | — | — | — | 80 | — | — | 144 |

TABLE 9

Condition 6

Charge-Discharge Operating Condition

| Step | | Temperature ° C. | Operation | Rate C | Time Hr | Anode SOC % (setting) | Cathode SOC % (setting) | Cut-Off Voltage V | Holding Time Hr |
|---|---|---|---|---|---|---|---|---|---|
| 1 | Charge | 25 | CC | 0.05 | 4 | 15 | — | — | — |
| 2 | Charge | 25 | CC | 0.1 | 10 | — | 70 | 4.45 | — |
| 3 | Hold | 25 | — | — | — | — | 70 | — | 120 |
| 4 | Discharge | 45 | CC | 0.1 | 10 | — | 10 | 2.0 | — |
| 5 | Charge | 45 | CC | 0.1 | 10 | — | 75 | 4.35 | — |
| 6 | Discharge | 45 | CC | 0.1 | 10 | — | 10 | 2.0 | — |
| 7 | Charge | 45 | CC | 0.1 | 10 | — | 90 | 4.45 | — |
| 8 | Discharge | 45 | CC | 0.1 | 10 | — | 10 | 2.0 | — |
| 9 | Charge | 45 | CC | 0.1 | 10 | — | 100 | 4.55 | — |
| 10 | Discharge | 45 | CC | 0.1 | 10 | — | 10 | 2.0 | — |
| 11 | Charge | 45 | CC | 0.1 | 12 | 80 | — | — | — |
| 12 | Hold | 45 | — | — | — | 80 | — | — | 456 |
| 13 | Hold | 25 | — | — | — | 80 | — | — | 144 |

TABLE 10

Condition 7

Charge-Discharge Operating Condition

| Step | Operation | Temperature ° C. | Opera-tion | Rate C | Time Hr | Anode SOC % (setting) | Cathode SOC % (setting) | Cut-Off Voltage V | Holding Time Hr |
|---|---|---|---|---|---|---|---|---|---|
| 1 | Charge | 25 | CC | 0.05 | 4 | 15 | — | — | — |
| 2 | Charge | 45 | CC | 0.1 | 10 | — | 73 | 4.45 | — |
| 3 | Hold | 45 | — | — | — | — | 73 | — | 120 |
| 4 | Discharge | 45 | CC | 0.1 | 10 | — | 10 | 2.0 | — |
| 5 | Charge | 45 | CC | 0.1 | 10 | — | 75 | 4.35 | — |
| 6 | Discharge | 45 | CC | 0.1 | 10 | — | 10 | 2.0 | — |
| 7 | Charge | 45 | CC | 0.1 | 10 | — | 90 | 4.45 | — |
| 8 | Discharge | 45 | CC | 0.1 | 10 | — | 10 | 2.0 | — |
| 9 | Charge | 45 | CC | 0.1 | 10 | — | 100 | 4.55 | — |
| 10 | Discharge | 45 | CC | 0.1 | 10 | — | 10 | 2.0 | — |
| 11 | Charge | 45 | CC | 0.1 | 12 | 80 | — | — | — |
| 12 | Hold | 45 | — | — | — | 80 | — | — | 456 |
| 13 | Hold | 25 | — | — | — | 80 | — | — | 144 |

TABLE 11

Condition 8

Charge-Discharge Operating Condition

| Step | Operation | Temperature ° C. | Opera-tion | Rate C | Time Hr | Anode SOC % (setting) | Cathode SOC % (setting) | Cut-Off Voltage V | Holding Time Hr |
|---|---|---|---|---|---|---|---|---|---|
| 1 | Charge | 45 | CC | 0.05 | 4 | 15 | — | — | — |
| 2 | Charge | 45 | CC | 0.1 | 10 | — | 73 | 4.45 | — |
| 3 | Hold | 45 | — | — | — | — | 73 | — | 120 |
| 4 | Discharge | 45 | CC | 0.1 | 10 | — | 10 | 2.0 | — |
| 5 | Charge | 45 | CC | 0.1 | 10 | — | 75 | 4.35 | — |
| 6 | Discharge | 45 | CC | 0.1 | 10 | — | 10 | 2.0 | — |
| 7 | Charge | 45 | CC | 0.1 | 10 | — | 90 | 4.45 | — |
| 8 | Discharge | 45 | CC | 0.1 | 10 | — | 10 | 2.0 | — |
| 9 | Charge | 45 | CC | 0.1 | 10 | — | 100 | 4.55 | — |
| 10 | Discharge | 45 | CC | 0.1 | 10 | — | 10 | 2.0 | — |
| 11 | Charge | 45 | CC | 0.1 | 12 | 80 | — | — | — |
| 12 | Hold | 45 | — | — | — | 80 | — | — | 456 |
| 13 | Hold | 25 | — | — | — | 80 | — | — | 144 |

TABLE 12

Condition 9 (Comparative Example)

Charge-Discharge Operating Condition

| Step | Operation | Temperature ° C. | Opera-tion | Rate C | Time Hr | Anode SOC % (setting) | Cathode SOC % (setting) | Cut-Off Voltage V | Holding Time Hr |
|---|---|---|---|---|---|---|---|---|---|
| 1 | — | — | — | — | — | — | — | — | — |
| 2 | Charge | 25 | CC | 0.2 | 5 | — | 70 | 4.45 | — |
| 3 | Hold | 25 | — | — | — | — | 70 | — | 120 |
| 4 | Discharge | 25 | CC | 0.2 | 5 | — | 10 | 2.0 | — |
| 5 | Charge | 25 | CC | 0.2 | 5 | — | 75 | 4.35 | — |
| 6 | Discharge | 25 | CC | 0.2 | 5 | — | 10 | 2.0 | — |
| 7 | Charge | 25 | CC | 0.2 | 5 | — | 90 | 4.45 | — |
| 8 | Discharge | 25 | CC | 0.2 | 5 | — | 10 | 2.0 | — |
| 9 | Charge | 25 | CC | 0.2 | 5 | — | 100 | 4.55 | — |
| 10 | Discharge | 25 | CC | 0.2 | 5 | — | 10 | 2.0 | — |
| 11 | Charge | 25 | CC | 0.2 | 6 | 80 | — | — | — |
| 12 | Hold | 45 | — | — | — | 80 | — | — | 456 |
| 13 | Hold | 25 | — | — | — | 80 | — | — | 144 |

TABLE 13

| Cell Specification | | Condition | Discharge Capacity mAh/g | Capacity Retention (%) |
|---|---|---|---|---|
| Inventive Example 1 | Pre-Cell Example 1 | 1 | 265 | 73 |
| Inventive Example 2 | Pre-Cell Example 1 | 2 | 265 | 74 |
| Inventive Example 3 | Pre-Cell Example 1 | 3 | 271 | 74 |
| Inventive Example 4 | Pre-Cell Example 1 | 4 | 273 | 74 |
| Inventive Example 5 | Pre-Cell Example 1 | 5 | 275 | 76 |
| Inventive Example 6 | Pre-Cell Example 1 | 6 | 285 | 75 |
| Inventive Example 7 | Pre-Cell Example 1 | 7 | 290 | 74 |
| Inventive Example 8 | Pre-Cell Example 1 | 8 | 290 | 73 |
| Inventive Example 9 | Pre-Cell Example 2 | 5 | 275 | 76 |
| Inventive Example 10 | Pre-Cell Example 3 | 5 | 275 | 77 |
| Inventive Example 11 | Pre-Cell Example 4 | 5 | 275 | 76 |
| Inventive Example 12 | Pre-Cell Example 5 | 5 | 275 | 78 |
| Inventive Example 13 | Pre-Cell Example 6 | 5 | 270 | 76 |
| Inventive Example 14 | Pre-Cell Example 7 | 5 | 270 | 80 |
| Inventive Example 15 | Pre-Cell Example 8 | 5 | 270 | 82 |
| Inventive Example 16 | Pre-Cell Example 9 | 5 | 278 | 73 |
| Inventive Example 17 | Pre-Cell Example 10 | 5 | 267 | 83 |
| Inventive Example 18 | Pre-Cell Example 11 | 5 | 269 | 84 |
| Inventive Example 19 | Pre-Cell Example 12 | 7 | 266 | 86 |
| Inventive Example 20 | Pre-Cell Example 13 | 7 | 267 | 87 |
| Inventive Example 21 | Pre-Cell Example 14 | 7 | 265 | 82 |
| Inventive Example 22 | Pre-Cell Example 12 | 5 | 271 | 85 |
| Inventive Example 23 | Pre-Cell Example 12 | 6 | 274 | 84 |
| Inventive Example 24 | Pre-Cell Example 12 | 8 | 280 | 86 |
| Inventive Example 25 | Pre-Cell Example 15 | 5 | 282 | 80 |
| Inventive Example 26 | Pre-Cell Example 16 | 5 | 283 | 82 |
| Inventive Example 27 | Pre-Cell Example 17 | 5 | 288 | 81 |
| Comparative Example 1 | Pre-Cell Example 1 | 9 | 225 | 45 |
| Comparative Example 2 | Pre-Cell Example 6 | 9 | 225 | 55 |
| Comparative Example 3 | Pre-Cell Example 9 | 9 | 225 | 57 |
| Comparative Example 4 | Pre-Cell Example 15 | 9 | 225 | 60 |

While the present invention is described with several embodiments and examples, it is not intended that the present invention is not limited thereto, and various changes may be made within the gist of the present invention. For example, with regard to the configuration, the cell may have any of a variety of shapes such as rectangular shape, paper type, laminate type, cylinder type and coin type in addition to the laminated cell type. Further, while the cell components include a current collector, an insulation plate and the like, they are not specifically limited, but may be selected according to the cell shape as described above.

The invention claimed is:

1. A method for manufacturing a non-aqueous electrolyte secondary cell, comprising:
   (A) preparing a pre-cell comprising:
      a cathode comprising a layered lithium-containing transition metal oxide of the following composition formula as a cathode active material $Li_{1.5}[Ni_aCo_bMn_c[Li]_d]O_3$ where a, b, c and d satisfy $0<a<1.4$, $0\leq b<1.4$, $0<c<1.4$, $0<d\leq 0.5$, $a+b+c+d=1.5$, and $1.0\leq a+b+c<1.5$;
      an anode comprising a carbon-based material as an anode active material; and
      an electrolytic solution containing an organic solvent, a lithium salt electrolyte and an additive;
   (B) carrying out an anode aging treatment that is a charge-discharge cycle treatment of applying a voltage between the cathode and the anode of the prepared pre-cell;
   (C) subsequently carrying out a cathode activating treatment that is a charge-discharge cycle treatment of applying a voltage between the cathode and the anode, the cathode activating treatment carried out by applying a voltage lower than a potential plateau region of the cathode active material; and
   (D) subsequently applying a voltage within a range of 4.5 V to 4.8 V that is a voltage within or over the potential plateau region of the cathode active material.

2. The method for manufacturing the non-aqueous electrolyte secondary cell according to claim 1, wherein the anode aging treatment is carried out such that charge level of the non-aqueous electrolyte secondary cell is maintained at 10% to 30% of a full charge (SOC).

3. The method for manufacturing the non-aqueous electrolyte secondary cell according to claim 1, wherein the voltage applied in the anode aging treatment is lower than the voltage applied in the cathode activating treatment.

4. The method for manufacturing the non-aqueous electrolyte secondary cell according to claim 1, wherein the anode aging treatment is carried out at the voltage of 3.5 V or less.

5. The method for manufacturing the non-aqueous electrolyte secondary cell according to claim 1, wherein in the cathode activating treatment, a charge-discharge cycle treatment of applying the voltage lower than the potential plateau region is controlled such that a charging rate is equal to or slower than a discharging rate.

6. The method for manufacturing the non-aqueous electrolyte secondary cell according to claim 1, further comprising: after the anode aging treatment and the cathode activating treatment, carrying out a charge-discharge cycle treatment in which charge level of the non-aqueous electrolyte secondary cell is maintained at 60% or more to less than 100% of a full charge (SOC).

7. The method for manufacturing the non-aqueous electrolyte secondary cell according to claim 1, further comprising: after the anode aging treatment and the cathode activating treatment, carrying out a charge-discharge cycle treatment in which charge level of the non-aqueous electrolyte secondary cell is maintained at 80% or more to less than 100% of a full charge (SOC).

8. The method for manufacturing the non-aqueous electrolyte secondary cell according to claim 1, wherein the potential plateau region of the cathode active material corresponds to a range from 4.3 to 4.65 V in applied voltage.

* * * * *